(12) United States Patent
Ding et al.

(10) Patent No.: US 7,356,805 B2
(45) Date of Patent: Apr. 8, 2008

(54) TEMPORAL AFFINITY ANALYSIS USING REUSE SIGNATURES

(75) Inventors: Chen Ding, Rochester, NY (US); Yutao Zhong, Rochester, NY (US)

(73) Assignee: University of Rochester, Rochester, NY (US)

( * ) Notice: Subject to any disclaimer, the term of this patent is extended or adjusted under 35 U.S.C. 154(b) by 714 days.

(21) Appl. No.: 10/750,552

(22) Filed: Jan. 2, 2004

(65) Prior Publication Data

US 2004/0260517 A1    Dec. 23, 2004

Related U.S. Application Data

(60) Provisional application No. 60/437,435, filed on Jan. 2, 2003.

(51) Int. Cl.
G06F 9/44 (2006.01)
G06F 9/45 (2006.01)
G06F 12/00 (2006.01)

(52) U.S. Cl. ............ 717/128; 717/131; 717/154; 711/159

(58) Field of Classification Search .......... 717/130, 717/131, 128, 154; 711/159
See application file for complete search history.

(56) References Cited

U.S. PATENT DOCUMENTS 5,349,656 A * 9/1994 Kaneko et al. ........... 718/102
6,421,668 B1 * 7/2002 Yakhini et al. ............ 707/6
6,609,088 B1   8/2003 Wuytack et al.
6,804,733 B1 * 10/2004 Michel et al. ............ 710/68
7,007,029 B1 * 2/2006 Chen ...................... 707/100
2004/0249809 A1  12/2004 Ramani et al.
2006/0265694 A1 * 11/2006 Chilimbi et al. .......... 717/124

OTHER PUBLICATIONS

Ding, C. and Zhong, Y 2001 Reuse Distance Analysis. Technical Report. UMI Order No. TR741., University of Rochester, 11 pages.*
Bowen, "The Relative Error of an Approximate Algorithm", Archived on Aug. 25, 2002 at <http://web.archive.org/web/20020825230137/http://www.ctl.ua.edu/math103/hamilton/relerror.htm>, accessed Apr. 10, 2007, 1 page.*
Y. Zhong, C. Ding, and K. Kennedy. Reuse distance analysis for scientific programs. In Proceedings of Workshop on Languages, Compilers, and Run-time Systems for Scalable Computers, Washington DC, Mar. 2002, 15 pages.*
"Linear Regression", Yale University, archived on Sep. 14, 2001 at <http://web.archive.org/web/20010914035746/http://stat.yale.edu/Courses/1997-98/101/linreg.htm>, accessed and printed on Apr. 11, 2007, 3 pages.*

* cited by examiner

*Primary Examiner*—Tuan Dam
*Assistant Examiner*—J. Derek Rutten
(74) *Attorney, Agent, or Firm*—Blank Rome LLP

(57) ABSTRACT

Reuse distance is the number of data which are accessed between accesses of a datum. The computation of reuse distance uses a search tree and is carried out through approximate analysis, pattern recognition, or distance-based sampling. The reuse distance can be used to detect reference affinity, that is, to detect which data are accessed together.

56 Claims, 8 Drawing Sheets

TEMPORAL AFFINITY ANALYSIS USING REUSE SIGNATURES

REFERENCE TO RELATED APPLICATION

The present application claims the benefit of U.S. Provisional Patent Application No. 60/437,435, filed Jan. 2, 2003, whose disclosure is hereby incorporated by reference in its entirety into the present disclosure.

FIELD OF THE INVENTION

The present invention is directed to a technique for analyzing data reuse in computing systems and more particularly to such a technique in which the reuse patterns of various data are analyzed together for grouping of the data or like purposes.

DESCRIPTION OF RELATED ART

While the memory of most machines is organized as a hierarchy, program data are laid out in a uniform address space. All current PCs and workstations use cache blocks of at least 64 bytes, making the utilization an important problem. If only one word is useful in each cache block, a cache miss will not serve as a prefetch for other useful data. Furthermore, the program would waste up to 93% of memory transfer bandwidth and 93% of cache space, causing even more memory access.

Caching is widely used in many computer programs and systems, and cache performance increasingly determines system speed, cost, and energy usage. The effect of caching depends on program locality or the pattern of data reuse. Many applications may have a consistent recurrence pattern at the whole-program level, for example, reusing a large amount of data across the time steps of an astronomical simulation, the optimization passes of a compiler, or the moves of a game-playing program. To exploit program locality, new cache designs are adding more cache levels and dynamic configuration control. As the memory hierarchy becomes deeper and more adaptive, its performance will increasingly depend on the ability to predict whole-program locality.

The prior art provides mainly three ways of locality analysis: by a compiler, which analyzes loop nests but is not as effective for dynamic control flow and data indirection; by a profiler, which analyzes a program for select inputs but does not predict its behavior change in other inputs; or by run-time analysis, which cannot afford to analyze every access to every data.

SUMMARY OF THE INVENTION

The inquiry continues for a prediction scheme that is efficient, accurate, and applicable to general-purpose programs. It is an object of the invention to provide such a prediction scheme.

The present invention predicts locality in programs that have consistent reuse patterns. Since different runs of the same program may use different data and go through different control flow, the analysis is not based on program code nor its data but on a concept which in the present disclosure will be called the reuse distance. In a sequential execution, reuse distance is the number of distinct data elements accessed between two consecutive references to the same element. It measures the volume of the intervening data not the time between two accesses. While time distance is unbounded in a long-running program, reuse distance is always bounded by the size of physical data.

In 1970, Mattson et al. studied stack algorithms in cache management and defined the concept of stack distance. Reuse distance can be derived from stack distance by implementing it as LRU stack distance or stack distance using the LRU (Least Recently Used) replacement policy. The present inventors use a different (and shorter) name to reflect the purpose in program analysis, not necessarily limited to cache management. Reuse distance is measured much faster using a tree instead of a stack.

Reuse distance is a powerful basis for pattern analysis for three reasons. First, reuse distance is at most a linear function of program data size. The search space is therefore much smaller for pattern recognition and prediction. Second, reuse distances reveal invariance in program behavior. Most control flow perturbs only short access sequences but not the cumulative distance over millions of data. Long reuse distances suggest important data and signal major phases of a program. For example, a distance equal to 50% of program data is likely to span a significant program phase. Finally and most importantly for this work, reuse distance allows direct comparison of data behavior in different program runs. Distance-based correlation does not require two executions to have the same data or execute the same function. Therefore, it can identify consistent patterns in the presence of dynamic data allocation and input-dependent control flow.

The present invention includes several new techniques. The first is approximate reuse distance analysis, which bounds the relative error to arbitrarily close to zero. It takes $O(\log \log M)$ time per access and $O(\log M)$ total space, where M is the size of program data. The second is pattern recognition, which profiles a few training runs and extracts regular patterns as a function of program data size. The third one, distance-based sampling, predicts reuse pattern for an unknown data input at run time by sampling at the beginning of the execution when needed. Two others are forms of affinity analysis (k-distance analysis and k-percent analysis), which indicates situations in which data are accessed together. Together these techniques provide a general method that predicts locality patterns in whole or parts of a program or its data.

The following should be noted. First, the goal of the present invention is not limited to cache analysis. Cache performance is not a direct measure of a program but a projection of a particular execution on a particular cache configuration. The goal is program analysis. The invention is capable of finding patterns consistent across all data inputs and analyzes the reuses of data elements instead of cache blocks. The element-level behavior is harder to analyze because it is not amortized by the size of cache blocks or memory pages (element miss rate is much higher than cache-block miss rate). The full distance is analyzed, not its comparison with fixed cache sizes. Per-element, full-length analysis is most precise and demands highest efficiency and accuracy.

The goal is to define common recurrence patterns and measure their presence in representative programs. As dependence analysis analyzes loops that can be analyzed, the invention can predict patterns that are predictable. In many cases, reuse distance can extend the scope of locality analysis to the whole program.

The present invention provides a general method for predicting program locality. It makes three contributions. First, it builds on the 30-year-long series of work on stack distance measurement. By using approximate analysis with arbitrarily high precision, for the first time it reduces the space cost from linear to logarithmic. The new analyzer achieves a consistently high speed for practically any large data and long distance. Second, it extends profiling to provide predication for data inputs other than profiled ones. It defines common locality patterns including the constant, linear, and a few sub-linear patterns. Finally, it enables correlation among different executions with distance-based histogram and sampling, which overcomes the limitation of traditional code or data based techniques. When tested on an extensive set of benchmarks, the new method achieves 94% accuracy and 99% coverage, suggesting that pattern prediction is practical for use by locality optimizations in compilers, architecture, and operating systems.

A particular application of the invention is to group together data which are accessed together. To improve cache utilization, it is necessary to group related data into the same cache block. The question is how to define the relation. The relation should meet three requirements. First, it should be solely based on how data are accessed. For example in an access sequence "abab . . . ab", a and b are related and should be put in the same cache block, regardless how they are allocated and whether they are linked by pointers. Second, the relation must give a unique partition of data. Consider for example the access sequence "abab::ab:::bcbc::bc". Since data a and c are not related, b cannot relate to both of them because it cannot stay in two locations in memory. Finally, the relation should be a scale. The block of different memory levels is increasingly large, from cache line to memory page. After grouping "most related" data into the smallest block, "next related" data should be grouped into larger blocks. In summary, the relation should give a unique and hierarchical organization of all program data. In the present application, such a relation is called the reference affinity, which measures how close a group of data are accessed together in an execution. Unlike most other program analysis, the present invention can measure the "togetherness" using the LRU stack distance (reuse distance), defined as the amount of data accessed between two memory references in an execution trace. Like locality, stack distance is bounded, even for long-running programs. The long distance often reveals long-range data access patterns that may otherwise hide behind complex control flows, indirect data access, or variations in coding and data allocation.

The new definition gives a unique partition of program data for each distance k. When the value of k is decreased, reference affinity gives a hierarchical decomposition and finds data sub-groups with closer affinity, much in the same way the focus is sharpened by reducing the radius of a circle. Reuse pattern analysis shows that many programs have a consistent pattern across all data inputs, even for complex programs or regular programs after complex compiler optimizations. This suggests that the reference affinity of the whole program can be analyzed by looking at its reuse signatures from training runs.

A preferred embodiment of the invention includes k-distance analysis, which simplifies the requirements of reference affinity into a set of necessary conditions about reuse signatures. The simplified conditions can then be checked efficiently for large, complex programs. The parameter k has an intuitive meaning—elements in the same group are almost always used within a distance of k data elements. By varying the value of k, the analysis gives the hierarchical affinity relation among data arrays and structure fields. By picking different values of k, it gives appropriate data layout for different levels of memory hierarchy, from a single cache block to physical memory. The analysis handles sequential programs with arbitrarily complex control flow, indirect data access, and dynamic memory allocation. The analysis uses multiple training runs to take into account the variation caused by program inputs. A similar technique, k-percent analysis, will also be presented.

There are thus three techniques for reuse pattern analysis and two for temporal affinity. However, those skilled in the art who have reviewed the present disclosure will recognize that the invention can be generalized to the extent recited in the appended claims.

Reference affinity gives a unique and hierarchical partition of all data. The present invention has rigorous properties owing to its direct link, k, to the affinity definition. Experiments have shown that the new method reveals a rich affinity relationship among program data, which forms a hierarchy of detailed layers with a different but intuitive distance k. In array and structure reorganization, k-distance analysis outperforms all other methods with remarkable consistency. The close agreement between theoretical properties and experimental observations suggests that reference affinity is an effective way to bridge the gap between the memory hierarchy of a machine and the linear data layout of a program.

The present invention has broad applicability applies to analysis of a trace of events, not necessarily generated by a computer program. The concept of affinity refers to events that commonly occur together in time. The techniques are directly applicable for other types of programs and other types of data. An example is the sale record of a grocery store. The goods would be data and purchase record is the program (the actions). Another example is a biology process where the data means the genes, and the program means the activation sequence. Thus, the concepts of reuse distance and reuse affinity, as disclosed herein, can be expanded to reoccurrence distance and affinity, and more broadly, any concept involving reuse can be generalized to reoccurrence. The present invention applies to any system, real or virtual, that can be described by a computer program.

The following papers relate to the present invention and are hereby incorporated by reference in their entireties into the present application:

C. Ding et al, "Predicting Whole-Program Locality through Reuse Distance Analysis," ACM SIGPLAN Conference on Programming Language Design and Implementation, San Diego, Calif., Jun. 9-11, 2003 (PLDI'03); and Y. Zhong et al, "Array Regrouping and Structure Splitting Using Whole-Program Reference Affinity," not yet published.

BRIEF DESCRIPTION OF THE DRAWINGS

A preferred embodiment of the present invention, uses thereof, and variations thereon will be presented with reference to the drawings, in which.

DETAILED DESCRIPTION OF THE PREFERRED EMBODIMENT

A preferred embodiment of the invention and uses thereof will now be set forth in detail with reference to the drawings.

Approximate Reuse Distance Analysis

In a distance analysis, program execution is viewed as a sequence of accesses to data. Measuring reuse distance between two data accesses means counting the number of distinct data between them. In the worst case, the measurement needs to examine all preceding accesses for each access in the trace. So a naive algorithm would need $O(N^2)$ time and $O(N)$ space for a trace of length N. This cost is impractical for real programs, which have up to hundreds of billions of memory accesses.

Figure 1A:
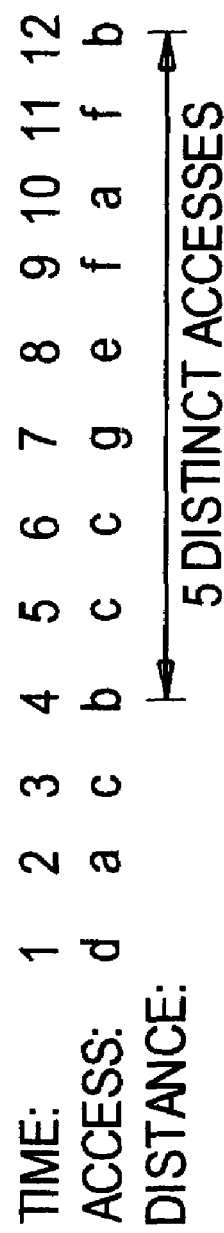
FIGS. 1A-1D are diagrams showing steps in the formation of a search tree from a trace of data access.
Figure 1B:
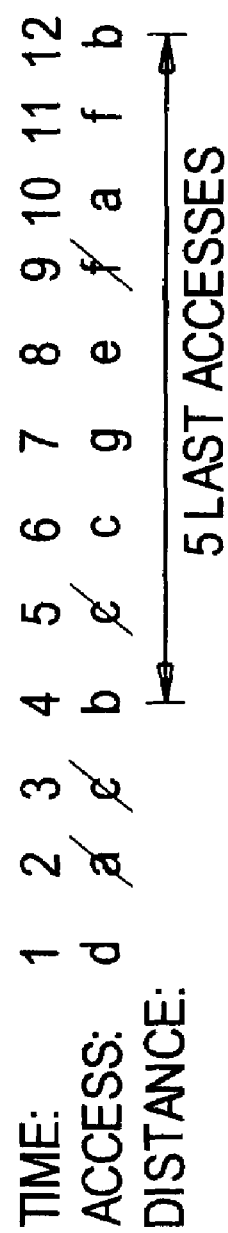

The time and space costs can be improved, as shown by the example in FIGS. 1A-1D. FIG. 1A shows that it is necessary to count accesses to distinct data. As shown, the reuse distance between two b's is 5. FIG. 1B shows that instead of storing the whole trace, one can store (and count) just the last access of each datum.

Figure 1C:
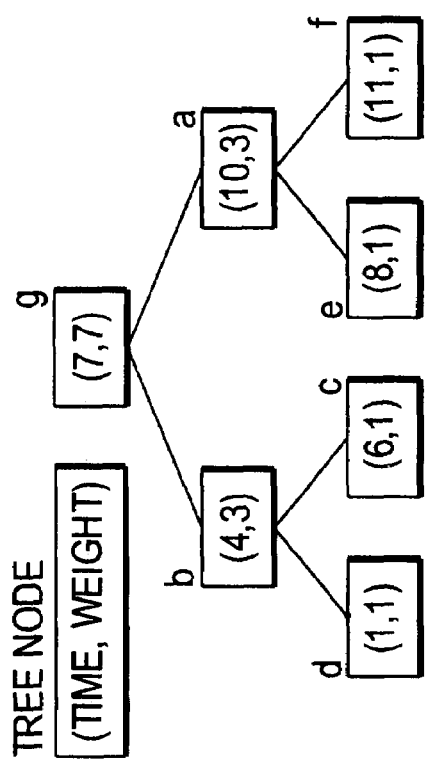

FIG. 1C shows that the last-access time of all data can be organized in a search tree. Each node represents a distinct element. The attribute time is the last access time, while weight is the number of nodes in the subtree. The tree search for the first b finds the reuse distance, which is the number of nodes whose last access time is greater than 4. The counting can be done in a single tree search if the weight or the number of nodes in all sub-trees is maintained. For a balanced tree, reuse-distance measurement takes $O(\log M)$ time per access and $O(M)$ total space, where M is the sizes of the program data. For a program with a large amount of data, the space requirement becomes a limiting factor. Each data element needs a tree node, which stores the last access time, pointers to its children, and the weight of its sub-tree. Since the tree data at least quadruple program data, they easily overflow physical memory and even the 32-bit address space for a program with more than 100 million data.

Figure 1D:
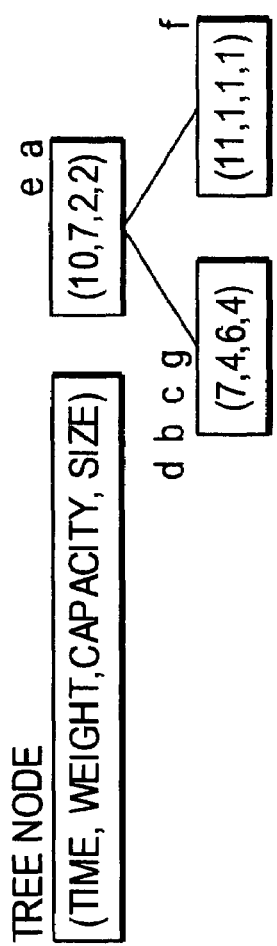

To reduce the space cost, approximate analysis is introduced for long reuse distances. If the length of a distance is in the order of millions, the accuracy of the last couple of digits rarely matters. The main feature of the present analysis is approximating a block of data in a tree node, as shown in FIG. 1D. The space requirement is reduced by a factor equal to the average block size. Using a large block size, the approximate analysis can make its tree data small enough to fit in not only the physical memory but also the processor cache.

FIG. 1D shows an approximation tree with 33% guaranteed accuracy. Attributes capacity and size are the maximal and current number of distinct elements represented by a node, time is their last access time, and weight is the total size of subtree nodes. The approximate distance of two b's is 3 or 60% of the actual distance.

The present disclosure does not consider the cost of finding the last data access time. That requires a hash table with one entry for each datum. The space cost is $O(M)$. However, Bennett and Kruskal showed that hashing can be done in a pre-pass, using blocked algorithms to reduce the memory requirement to arbitrarily low. The time complexity of hashing is constant per access, a well-studied problem compared to distance measurement.

Two approximation algorithms can be used, with different guarantee on the accuracy of the measured distance, $d_{measured}$, compared to the actual distance, $d_{actual}$, as shown below. The first uses a bounded relative error e, $$1 \geq e > 0 \text{ and } \frac{d_{actual} - d_{measured}}{d_{actual}} \leq e.$$

The second uses a bounded absolute error B, B>0, and $d_{actual} - d_{measured} \leq B$. Both methods also guarantee $d_{measured} \leq d_{actual}$. They will now be described in more detail.

Analysis with a Bounded Relative Error

The analysis guarantees a bounded error rate that can be arbitrarily close to zero. Given the current and last access time, the main routine uses a subroutine TreeSearchDelete to search the block tree and calculate reuse distance using sub-tree weights. Once the node containing the last access time is found, the subroutine TreeSearchDelete updates the capacity of the node. The new capacity is distance $$\text{distance} * \frac{e}{1-e}.$$

To simplify the notation, e' is used to represent $$\frac{e}{1-e}.$$

The value of distance is the number of distinct data accessed after this node. The subroutine uses distance as the approximate distance. The approximation is never greater than the actual distance. The maximal relative error e happens when the actual distance is distance*(1+e'). The formula for e' assumes that 1>e>0. The algorithm is not valid if e=0, which means no approximation. It is trivial to approximate if e=1: all reuse distance is simply reported as 0.

After capacity update, the subroutine TreeSearchDelete deletes the last access and inserts the current access. The tree insertion and deletion will rebalance the tree and update sub-tree weights. These two steps are not shown because they depend on the type of the tree being used, which can be an AVL, red-black, splay, or B-tree. The most important part of the algorithm is dynamic tree compression by subroutine TreeCompression. It scans tree nodes in reverse time order, updates their capacity as in TreeSearchDelete, and merges adjacent tree nodes when possible. The size of the merged node must be no more than the smaller capacity of the two nodes; otherwise, the accuracy cannot be guaranteed. Tree compression is triggered when the tree size exceeds $4*\log_{1+e} M+4$, where M is the number of accessed data. It guarantees that the tree size is cut by at least a half.

Now the time cost is considered. Assume that the tree is balanced and its size is T. The time for tree search, deletion, and insertion is $O(\log T)$ per access. Tree compression happens periodically after a tree growth of at least $2*\log_{1+e'} M+2$ or T/2 tree nodes. Since at most one tree node is added for each access, the number of accesses between successive tree compressions is at least T/2 accesses. Each compression takes $O(T)$ time because it examines each node in a constant time, and the tree construction from an ordered list takes $O(T)$. Hence the amortized compression cost is $O(1)$ for each access. The total time is therefore $O(\log T+1)$, or $O(\log \log M)$ per access.

Figure 5A:
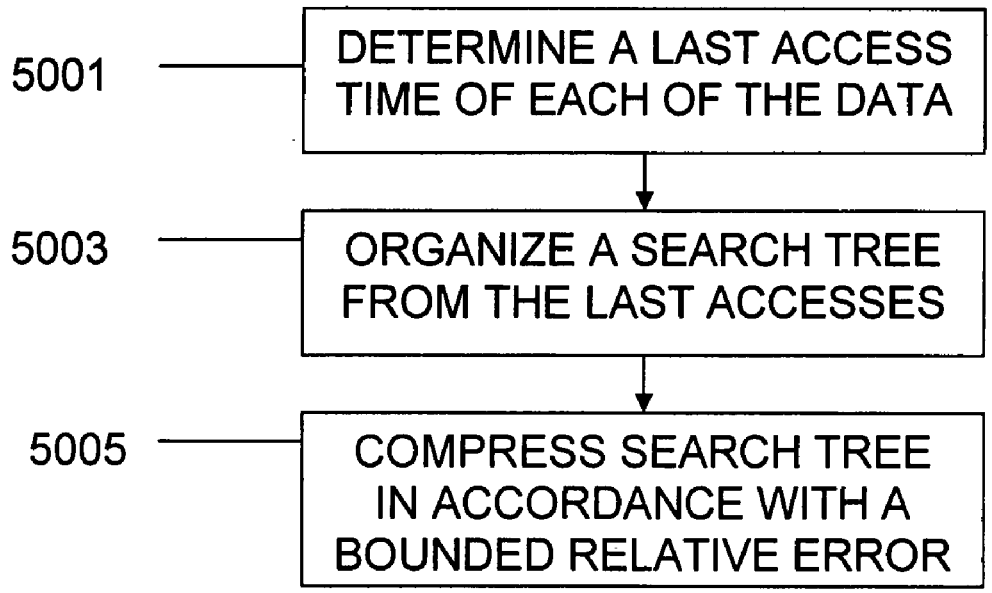
FIGS. 5A-5F are flow charts showing various processes performed in the preferred embodiment.

The process described above will be summarized with reference to the flow chart of FIG. 5A. In step 5001, a last access time of each of the data is determined. In step 5003, a search tree is organized from the last accesses, wherein the search tree comprises a node for each of the data, the node comprising the last access time and a weight of a sub-tree of the node. In step 5003, the search tree is compressed in accordance with the bounded relative error.

Analysis with a Bounded Absolute Error

For a cut-off distance C and a constant error bound B, the second approximation algorithm guarantees precise measurement of distance shorter than C and approximate measurement of longer distances with a bounded error B. It keeps the access trace in two parts. The precise trace keeps the last accessed C elements. The approximate trace stores the remaining data in a tree with tree nodes having capacity B. Periodically, the algorithm transfers data from the precise trace to the approximate trace.

In addition to using B-Tree, the precise trace can use a list, a vector, or any type of trees, and the approximate trace can use any type of trees, as long as two minimal requirements are met. First, the size of precise trace is bounded by a constant. Second, the minimal occupancy of the approximate tree is guaranteed. Invoking a transfer when the precise trace exceeds a preset size can satisfy the first requirement.

For the second requirement, a tree node is dynamically merged with any of its neighbors when the combined size is no more than B. The merge operation guarantees at least half utilization of the tree capacity. Therefore, the maximal size of the approximate tree is 2MB.

Figure 5B:
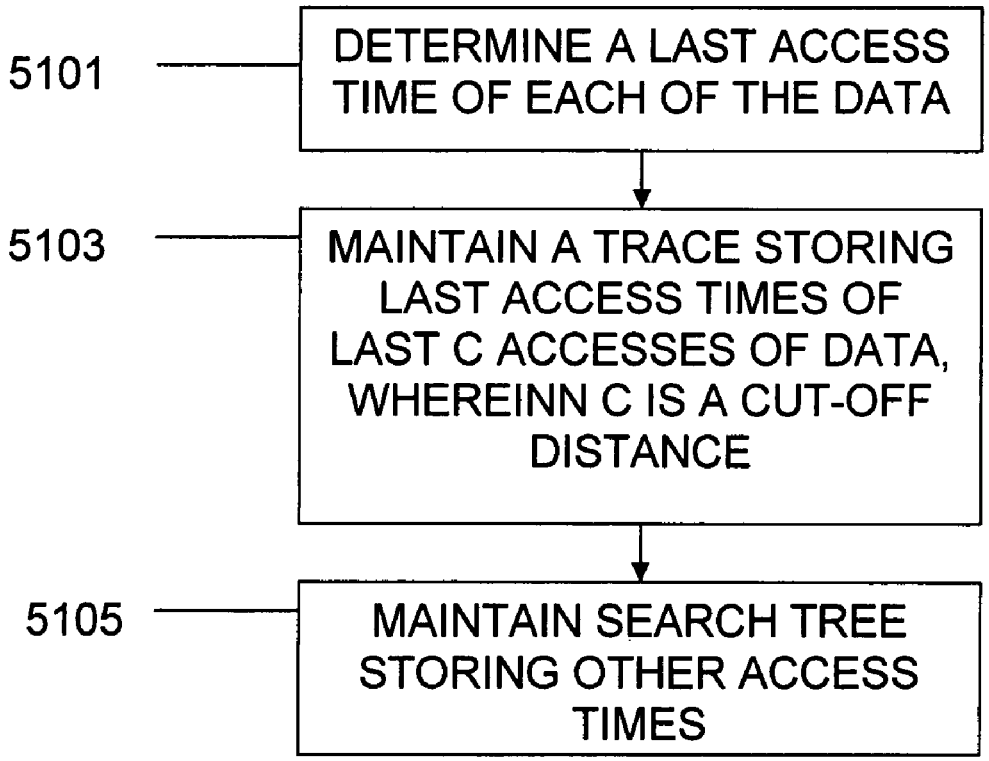

The process described above will be summarized with reference to the flow chart of FIG. 5B. In step 5101, the last access time of each of the data is determined. In step 5103, a trace is maintained storing the last access times of the last C accesses of the data. In step 5105, a search tree is maintained storing access times other than the last C accesses, each node in the search tree having a capacity B.

Pattern Recognition

Pattern recognition detects whether the recurrence pattern is predictable across different data inputs. Example recurrence patterns at the whole-program level include ocean simulation in a series of time steps, compilation of a collection of files, and computer chess-playing in a number of moves. Based on two or more training runs, pattern recognition constructs a parameterized reuse pattern. The main parameter is the size of data involved in program recurrences. This is not the same as the size of data touched by a program. The next section will show how to obtain an estimate of this number through distance-based sampling. In this section, it is assumed to exist and is referred to indistinctively as program data size.

The reuse, recurrence or locality pattern is defined as a histogram showing the percentage of memory accesses whose reuse distance falls inside consecutive ranges divided between 0 and the data size (maximal distance). Ranges of both logarithmic and linear sizes can be used. The present approach is not specific to a particular accuracy of the histogram. The three steps of pattern recognition will be described.

Collecting Reference Histograms

A reference histogram is a transpose of the reuse distance histogram. It sorts all memory accesses based on their reuse distance and shows the average distance of each k percent of memory references. For example, when k is 1, the reference histogram first gives the average distance for 1% shortest reuse distances, then the average for the next 1% shortest reuse distances, and so on.

The reference histogram is used for two purposes. First, the effect of non-recurrent parts of the program is isolated. Some instructions are executed per execution; some are repeated per program data. When the data size becomes sufficiently large, the effect of the former group diminishes into at most a single bin of the histogram.

Second, the size of the bin controls the granularity of prediction. A bin size of 1% means that finer distribution of distances within 1% of memory references are not predicted. A reference histogram is computed from a reuse-distance histogram by traversing the latter and calculating the average distance for each k % of memory references. Getting a precise histogram incurs a high space cost. An approximation is used again, since precise distances are not measured anyway. In the experiment, a reuse-distance histogram is formed using log-linear scale bins. The size of bins is a power of 2 up to 1024 and then it is 2048 for each bin. To improve precision, the average distance is calculated within each bin, and the average distance is used as the distance of all references in the bin when converting it to the reference histogram. The cost and accuracy of the approximation scheme can be adjusted by simply changing the size of bins in both types of histograms.

Recognizing Patterns

Figure 5C:
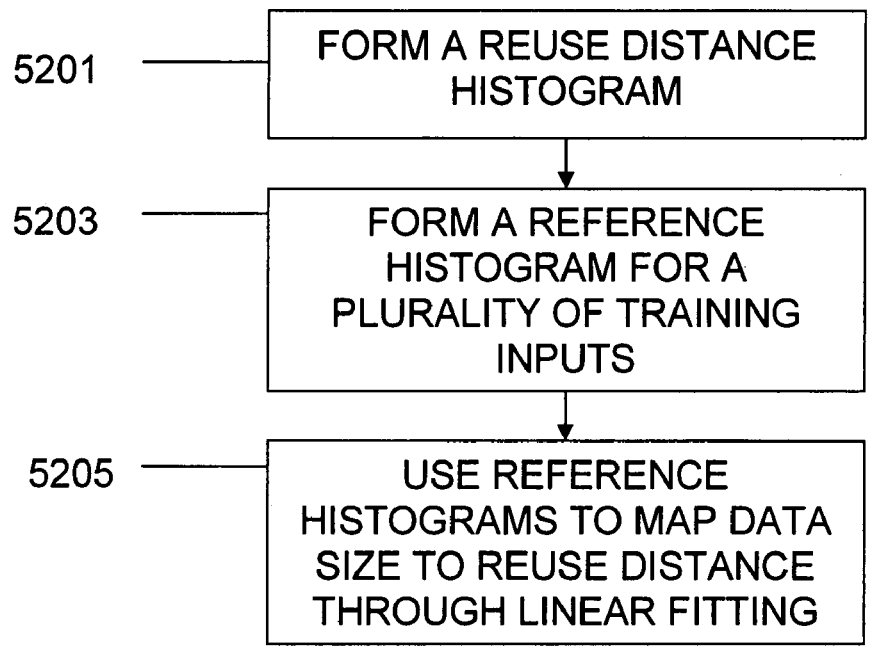

As shown in the flow chart of FIG. 5C, a reuse distance histogram is formed in step 5201. Given two reference histograms from two different data inputs (called training inputs; see step 5203), one can construct a formula for each bin. Let $d_{1i}$ be the distance of the ith bin in the first histogram, $d_{2i}$ be the distance of the ith bin in the second histogram, $s_1$ be the data size of the first training input, and $s_2$ the data size of the second input. Linear fitting is used in step 5205 to find the closest linear function that maps data size to reuse distance. Specifically, the task is to find the two coefficients, $c_i$ and $e_i$, that satisfy the following two equations.

$$d_{1i}=c_i+e_i*f_i(s_1)$$

$$d_{2i}=c_i+e_i*f_i(s_2)$$

Assuming the function $f_i$ is known, the two coefficients uniquely determine the distance for any other data size. The formula therefore defines the reuse-distance pattern for memory accesses in the bin. The overall pattern is the aggregation of all bins. The pattern is more accurate if more training profiles are collected and used in linear fitting. The minimal number of training inputs is two.

In a program, the largest reuse distance cannot exceed the size of program data. Therefore, the function $f_i$ can be at most linear, not a general polynomial function. In this work, the following choices of $f_i$ are considered The first is the function $p_{const}(x)=0$. That is called a constant pattern because reuse distance does not change with data size. The second is $p_{linear}(x)=x$. That is called a linear pattern. Constant and linear are the lower and upper bound of the reuse distance changes. Between them are sub-linear patterns, for which three can be considered: $p_{1/2}(x)=x^{1/2}$, $p_{1/3}(x)=x^{1/3}$, and $p_{2/3}(x)=x^{2/3}$. The first happens in two-dimension problems such as matrix computation. The other two happen in three-dimensional problems such as ocean simulation. Higher dimensional problems could be considered in the same way.

For each bin of the two reference histograms, the present embodiment calculates the ratio of their average distance, $d_{1i}/d_{2i}$, and picks $f_i$ to be the pattern function, $p_t$, such that $p_t(s_1)/p_t(s_2)$ is closest to $d_{1i}/d_{2i}$. Here t is one of the patterns described in the preceding paragraph. Sub-linear patterns from a different number of dimensions should not be mixed. In the experiments carried out by the inventors, the dimension of the problems was given as an input to the analyzer. This can be automated by trying all dimension choices and using the best overall fit.

Although the analysis can handle any sequential program, the generality comes with several limitations. The profiling inputs should be large enough to factor out the effect of non-recurring accesses. The smallest input used in the experiment has four million memory accesses. For linear and sub-linear patterns, the analysis needs inputs of different data sizes. The difference should be large enough to separate pattern functions from each other. For high-dimensional data, pattern prediction requires that different inputs have a similar shape, in other words, their size needs to be proportional or close to proportional in all dimensions. Otherwise, a user has to train the analyzer for each shape.

Finally, predicting reuse pattern does not mean predicting execution time. The prediction gives the percentage distribution but not the total number of memory accesses, just as loop analysis can know the dependence but not the total number of loop iterations. Once the pattern is recognized from training inputs, constant patterns in another input can be predicted statically. For other patterns, the data size of the other input is needed, for which distance-based sampling is used.

Distance-Based Sampling

The purpose of data sampling is to estimate data size in a program execution. For on-line pattern prediction, the sampler creates a twin copy of the program and instruments it to generate data access trace. When the program starts to execute, the sampling version starts to run in parallel until it finds an estimate of data size. Independent sampling requires that the input of the program be replicated, and that the sampling run do not produce side effects.

The sampling is distance-based. It uses the reuse distance analyzer and monitors each measured distance. If a distance is greater than a threshold, the accessed memory location is taken as a data sample. The sampler collects more data samples in the same way except that it requires data samples to have between each other a spatial distance of a fraction of the first above-threshold distance. The sampler records above-threshold reuse distances to all data samples, called time samples. Given the sequence of time samples of a data sample, the sampler finds peaks, which are time samples whose height (reuse distance) is greater than that of its preceding and succeeding time samples.

The sampler runs until seeing the first k peaks of at least m data samples. It then takes the appropriate peak as the data size. The peak does not have to be the actual data size. It just needs to be proportional to the data size in different inputs. The same sampling scheme is used to determine data size in both training and prediction runs. For most programs tested, it is sufficient to take the first peak of the first two data samples. An exception is Apsi. All its runs initialize the same amount of data as required by the largest input size, but smaller inputs use only a fraction of the data in the computation. The second peak is then used as the program data size. More complex cases happen when early peaks do not show a consistent relation with data size, or the highest peak appears at the end of a program. These cases are identified during pattern recognition, and the predictor is instructed to predict only the constant pattern.

The sampling can be improved by more intelligent peak finding. For example, the peak and the trough are required to differ by a certain factor, or a moving average is used to remove noises. The literature on statistics and time series is a rich resource for sample analysis. For pattern prediction, however, sophisticated methods are not needed yet because the (data-size) peak is either readily recognizable at the beginning or it is not well defined at all. The cost of distance-based sampling is significant since it needs to measure reuse distance of every memory reference until peaks are found. The analysis does not slow the program down since it uses a separate copy. It only lengthens the time taken to make a prediction. For minimal delay, it uses the fastest approximation analyzer.

It can also use selective instrumentation and monitor only distinct memory references to global and dynamic data. For long-running programs, this one-time cost is insignificant. In addition, many programs have majority of memory references reused in constant patterns, which are predicted without run-time sampling. Another use of distance-based sampling is to detect phases in a program. For this purpose, sampling is continued through the entire execution. Time segments between consecutive peaks are phases. A temporal graph of time samples shows recurrent accesses in time order and the length and shape of each recurrence. The evaluation section will use phase graphs to understand the results of pattern prediction.

Finding the first few peaks of the first few data samplings is an unusual heuristic because it is not based on keeping track of a particular program instruction or a particular data item. The peaks found by sampling in different program executions do not have to be caused by the same memory access to the same data. Very likely they are not. In programs with input-dependent control flow, one cannot guarantee the execution of a function or the existence of a dynamic data item. Distance-based sampling allows correlation across data inputs without relying on any pre-assumed knowledge about program code or its data.

Reference Affinity

An important use of the present invention is in detecting reference affinity, that is, determining which data are requested together and therefore should be grouped together. This section first defines three preliminary concepts and gives two examples of the reference affinity model. Then it presents the formal definition and proves the properties of the model including consistent affinity and hierarchical organization. An address trace or reference string is a sequence of accesses to a set of data elements. If a logical time is assigned to each access, the address trace is a vector indexed by the logical time. Letters such as x; y; z represent data elements, subscripted symbols such as $a_x$; $a'_x$ represent accesses to a particular data element x, and the array index $T[a_x]$ represents the logical time of the access $a_x$ on trace T.

The LRU stack distance between two accesses, $a_x$ and $a_y$, ($T[a_x]<T[a_y]$), in a trace T is the number of distinct data elements accessed in times $T[a_x],T[a_x]+1,\ldots,T[a_y]-1$. This is written as $dis(a_x; a_y)$. If $T[a_x]>T[a_y]$, let $dis(a_x; a_y)=dis(a_y; a_x)$. If $T[a_x]=T[a_y]$, $dis(a_x; a_y)=0$. The distance is the volume of data accessed between two points of a trace, so it is also called volume distance. In contrast, time distance is the difference between the logical time of two accesses. For example, the volume distance between the accesses to a and c in trace abbbc is 2, while the time distance is 4. The volume distance is Euclidean. Given any three accesses in the time order, $a_x$; $a_y$, and $a_z$, then $dis(a_x; a_z) \leq dis(a_x; a_y)+dis(a_y; a_z)$, because the cardinality of the union of two sets is no greater than the sum of the cardinality of each set.

Based on volume distance, a linked path is defined on a trace. It is parameterized by a distance bound k. There is a linked path from $a_x$ to $a_y$ ($x \neq y$) if and only if there exist t accesses, $a_{x1}, a_{x2}, \ldots, a_{xt}$, such that (1) $dis(a_x,a_{x1}) \leq k \wedge dis(a_{x1}, a_{x2}) \leq k \wedge \ldots \wedge dis(a_{xt}, a_y) \leq k$ and (2) $x_1, x_2, \ldots, x_t, x$ and y are different data elements. In other words, a linked path is a sequence of accesses to different data elements, and each link (between two consecutive members of the sequence) has a volume distance no greater than k, which is called the link length. The present specification will later restrict $x_1, x_2, \ldots, x_t$ to be members of some set S. If so, there is a linked path from $a_x$ to $a_y$ with link length k for set S.

Reference affinity will now be explained with two example address traces set forth below:

(1) xyz . . . xwzzy . . . yzvvvvvx . . .

The affinity group {x,y,z} with link length k=2

(2) wxwxuyzyz . . . zyzyvwxwx . . .

The affinity group {w,x,y,z} at k=2 becomes two groups {w,x} and {y,z} at k=1

The " . . . " represents accesses to data other than w, x, y, and z. In the first example, accesses to x, y, and z are in three periods. The three elements belong to the same affinity group because they are always accessed together. The consistency is important for data placement. For example, because x and w are not always used together, putting them into the same cache block would waste cache space when only one of the two is accessed. The example shows that finding this consistency is not trivial. The accesses to the three data elements appear in different orders, with different frequency, and mixed with accesses to other data. However, one property holds in all three time ranges—the accesses to the three elements are connected by a linked path with link length 2.

Affinity groups are parameterized by the link length k, and they form a partition of program data for each k. The second example above shows that this group partition has a hierarchical structure. The affinity group with the link length of 2 is {w,x,y,z}. If the link length is reduced to 1, the two new groups will be {w,x} and {y,z}. The structure is hierarchical with respect to the link length: groups at a smaller link length are subsets of groups at a greater link length. The hierarchical structure is useful in data placement because it may find different-sized affinity groups that match the capacity of the multi-level cache hierarchy.

The formal definition of strict reference affinity will now be presented. Given an address trace, a set G of data elements is a strict affinity group (i.e. they have reference affinity) with link length k if and only if:

1. for any $x \in G$, all its accesses $a_x$ must have a linked path from $a_x$ to some $a_y$ for each other member $y \in G$, that is, there exist different elements $x_1, x_2, \ldots, x_t \in G$ such that $dis(a_x,a_{y}) \leq k \wedge dis(a_{x1},a_{x2}) \leq k \wedge \ldots \wedge dis(a_{x_t},a_y) \leq k$; and 2. adding any other element to G will make Condition (1) impossible to hold.

Strict affinity groups are consistent because they form a partition of program data. In other words, each data element belongs to one and only one affinity group.

Reference affinity is consistent because all members will always be accessed together (i.e. linked by some linked path with the link length k). The consistency means that packing data in an affinity group will always improve cache utilization.

In addition, the group partition is unique because each data element belongs to one and only one group for a fixed k. The uniqueness removes any possible conflict, which would happen if a data element could appear in multiple affinity groups.

Strict reference affinity has a hierarchical structure—an affinity group with a shorter link length is a sub-set of an affinity group with a greater link length.

Elements of the same affinity group are always accessed together. When one element is accessed, all other elements will be accessed within a bounded volume distance.

Whole-Program Affinity

The reference affinity among source-level data will be studied. The present embodiment specifically targets data arrays and instances of structure fields because they account for major portions of global and heap data in most programs. Since an array or a field represents a set of data, the affinity definition should be extended. The affinity exists among data sets if the sets have the same number of elements, and one element in one set has reference affinity with one and only one unique element in every other set. In particular, reference affinity exists for two arrays, A and B, if it exists for A[i] and B[i] for all i. The affinity exists for structure fields, $f_1$ and $f_2$, if it exists for $o.f_1$ and $o.f_2$ for all instance o. Next, the reuse signature is introduced, the basis for whole-program affinity analysis. Then, k-distance analysis is presented.

Reuse Signature

The reuse signature of a set of data is the histogram of the reuse distance of their accesses. Ding and Zhong showed that the whole-program reuse signature exhibits a consistent pattern across data inputs in a surprisingly large number of complex programs including 13 Spec95 and Spec2K integer and floating-point benchmarks. The result suggests that the reuse signature can be reused from one profiling run to infer the reuse signatures in other executions. Therefore, reuse signature allows not just whole-trace analysis but also whole-program analysis of reference affinity. The use of reuse signature can be illustrated through an example program, Cheetah, a fully associative LRU cache simulator that is part of the SimpleScalar 3.0 tool set. The main data structure is a splay tree, and each tree node has a number of fields, of which three will be considered in this example to save space.

Figure 2A:
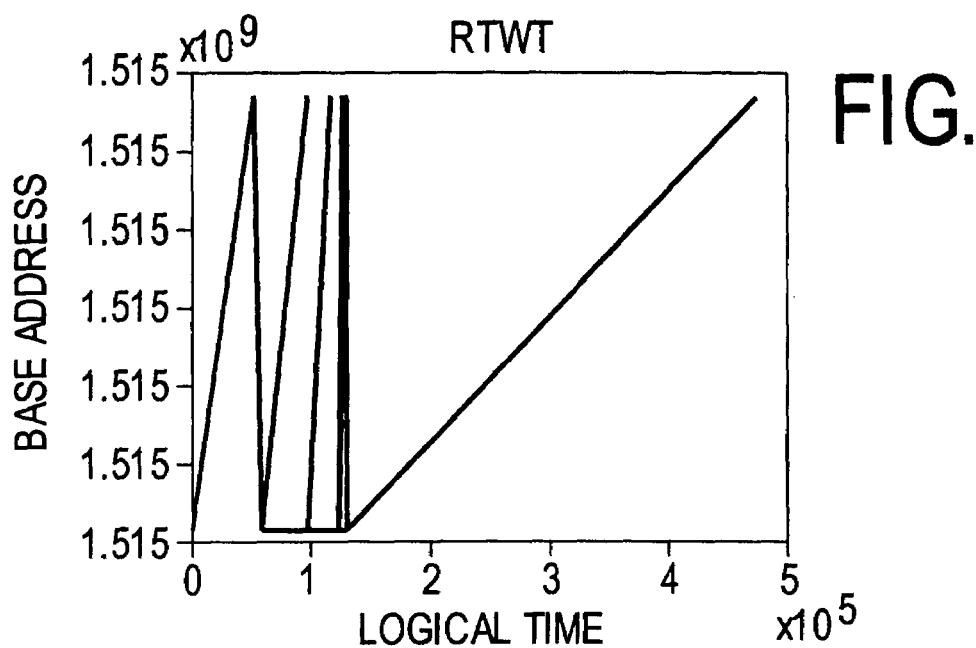
FIGS. 2A-2C are time-space graphs of data accesses.
Figure 2B:
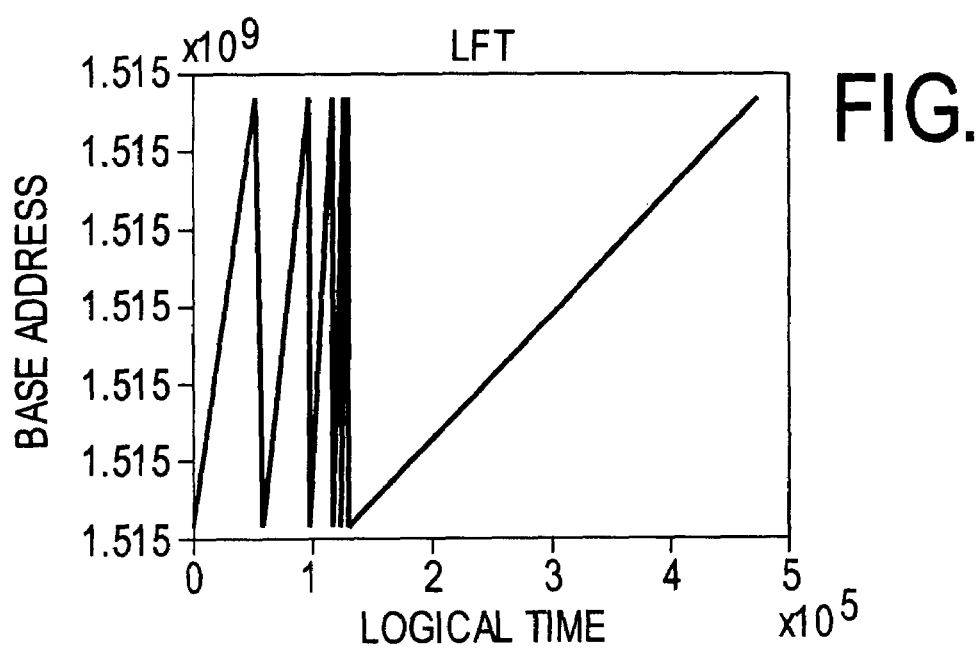
Figure 2C:
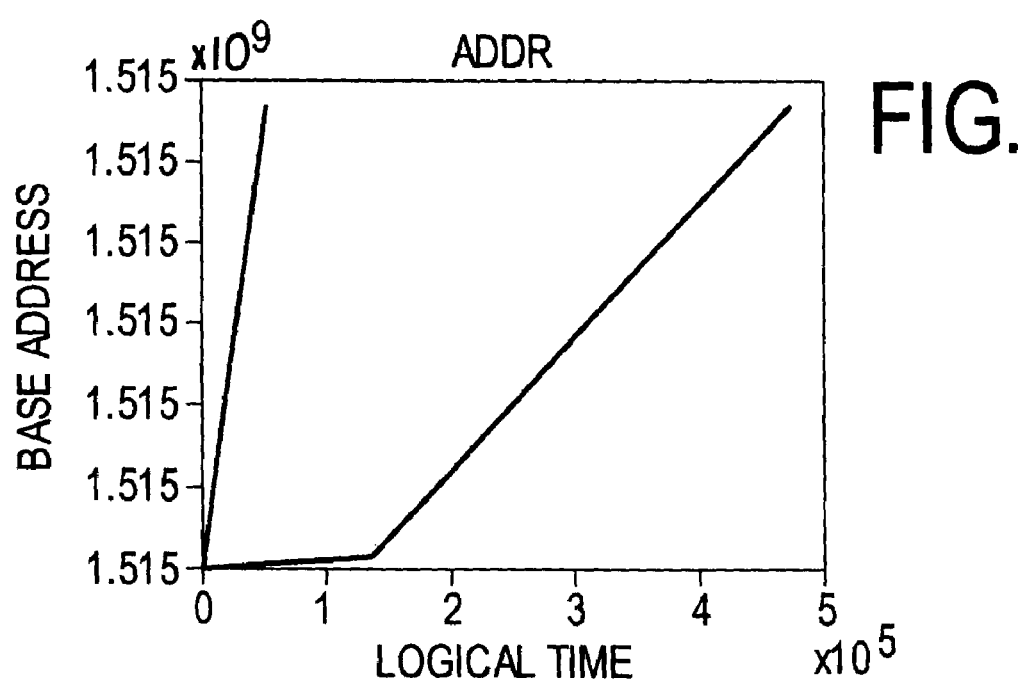

Based on a profile from a simple input, the accesses to the three fields on time-space graphs are as shown in FIGS. 2A-2C. Each access is a point whose x-axis value is the logical time (in memory references) and y-axis the memory address. The similarity of the graphs suggests that the two fields rtwt (the sub-tree weight) and lft (left-child pointer) have reference affinity because they seem to be always accessed together. The third field, addr, is accessed only occasionally together with the other two fields. A manual inspection of the splay tree algorithm confirms these conjectures. The program uses the first two fields together for tree rotation involved in every step of a tree search. The tree is indexed by time not address, so the program touches the third field only at the end of a tree search.

Figure 3:
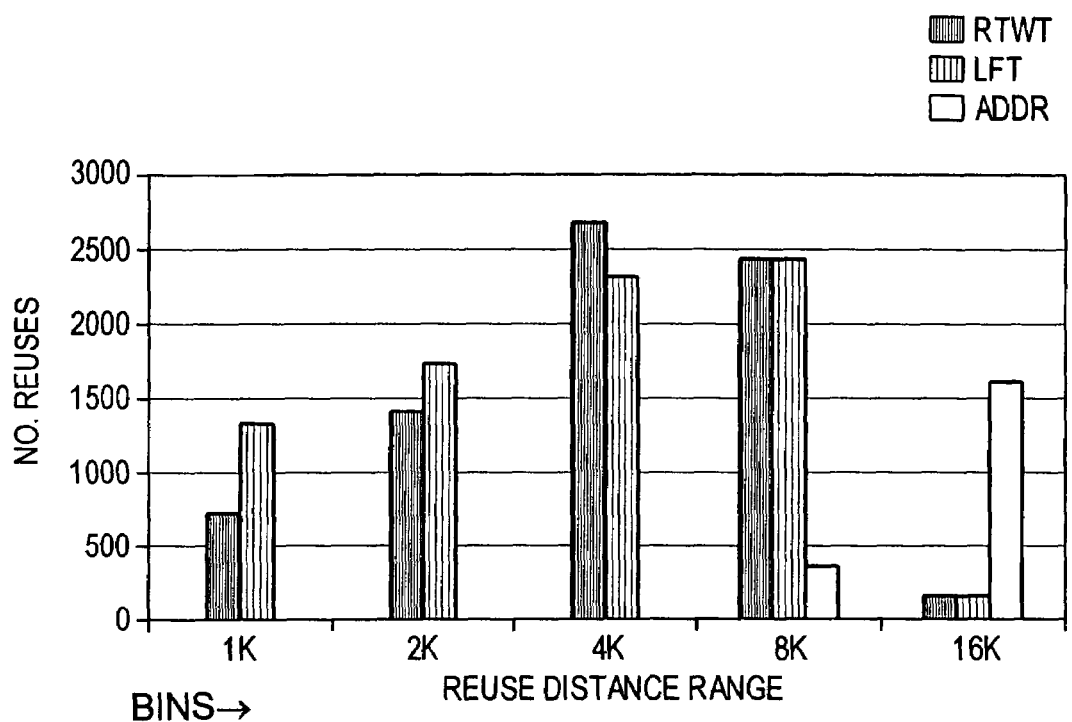
FIG. 3 is a reference histogram of the data accesses of FIGS. 2 A-2 C.

FIG. 3 shows the reuse signature of the three fields, which is a histogram of the reuse distance of accesses with a distance no smaller than 1024 to each field. The x-axis is a sequence of bins representing different ranges of reuse distance. The bins may be of the same size (linear scale), exponential size (log scale as in this example), or their combination (log-linear scale). The y-axis gives the number of memory accesses whose reuse distance falls into each bin.

Let's compare the reuse signature of rtwt and lft. The latter has more reuses at the first bin because it is repeatedly accessed during initialization. However, the additional reuses have a short distance and do not affect reference affinity. The number of reuses in the second and third bins also differ. This is because many reuses with a distance close to 4K are separated by the arbitrary bin boundary.

The total number of reuses with a distance more than 2K is very similar. In the last two (larger) bins, rtwt and lft have the same number of accesses, but the number is different for addr. The reuse signature is used for affinity analysis as follows. The present embodiment will treat reuse signatures as vectors, remove the first few elements (reuses whose distance is shorter than 2048), and find affinity groups by comparing the reuse signatures. As shown later, the correct affinity relation will be found. A remaining question is whether other inputs to Cheetah have the same affinity. As a simulator, the access pattern in Cheetah should depend completely on the input. After checking a few other inputs, the consistency remains: the time-space graph and the upper portion of the reuse signature remain identical between rtwt and lft but different from addr. In fact, multiple training runs can be considered by combining their reuse signatures and consequently rule out false affinity appeared in one input but not others. By comparing reuse signatures, one can find the reference affinity in Cheetah despite that the access pattern is hidden behind branches, recursive functions, and pointer indirections.

The problem has thus been converted from checking reference affinity in a trace, to checking patterns in time-space graph, and finally to checking the similarity of reuse signature. The compression of information is dramatic: from billions of memory accesses and time-space pairs to vectors of log M elements, where M is the size of program data (the maximal reuse distance). Next, the use of reuse signature will be formulated in terms of the necessary conditions of reference affinity.

K-distance analysis finds reference affinity by checking a necessary (but not sufficient) condition on the data reuse signature.

As a basic case, let an affinity group have two elements, x and y, always accessed within a link length k. After removing short-distance reuses, the number of accesses to x, $N_x$, should be no more than the number of accesses to y, $N_y$. Otherwise, two accesses of x must be within distance k to an access of y. The reuse distance of the second x access would have been less than or equal to 2k, contradictory to the fact that the short-distance reuses have been removed. For the same reason, $N_y$ should be no more than $N_x$; therefore, they are equal. Moreover, for each access to x, there is one and only one access to y that is within distance k.

Let the total distance of all accesses to (after removing short-distance reuses) be $S_x$ and the similar total distance for y be $S_y$. Then $|S_y - S_x|$ should be no more than $kN_x$. Hence $$\left| \frac{S_y}{N_y} - \frac{S_x}{N_x} \right| \le k.$$

In words, the average reuse distance of x and y differs by no more than k.

When generalized to two sets of data, the necessary condition is slightly different: the average reuse distance of the accesses to the first data set cannot differ by more than k from the average distance of the accesses to the second data set. The difference of the total distance between the two sets is less than the sum of the difference between each affinity pair, which is k|N|, where |N| is the total number of accesses to any data set. The condition is necessary, as shown by the derivation. It is not sufficient. The reuse distance of each access is not checked, but only the average distance calculated from the total distance. It is possible that the total distance is the same but individual reuses differ more than k in distance. An improvement is to check the sum of each sub-set of memory accesses instead of the set of all accesses. The difficulty is to partition in the same way for accesses of the two data sets. One uses the bins of the reuse signature and checks the condition in each bin separately. Considering partition errors at the bin boundaries (an example shown before in FIG. 3), the necessary condition is applied to the sum of the average of all bins rather than the average of each bin. The improved condition is as follows. Let the reuse signature have B bins after removing short-distance bins. Let X and Y be the two sets of data, and $Avg_i^x$ and $Avg_i^y$ be the average reuse distance of the two data sets in the ith bin. Then the following condition results:

$$d = \sum_{i=1}^{B} |Avg_i^X - Avg_i^Y| \le k \cdot B. \tag{1}$$

The equation ensures that the average reuse distance per bin differs no more than k. The left-hand side of the inequality is the difference between X and Y.

A related technique is called k-percent analysis, or k % clustering. That technique, as shown in FIG. 5F, compares the reuse signatures of the data in step 5501 and groups two reuse signatures X and Y (of length B) in step 5503 if the difference p, given by the equation below, is less than k %. The difference in each bin, $|x_i - y_i|$, can be the number of reuses, the sum of the reuse distance, or both.

$$p_{<X,Y>} = \frac{\sum_{i=1}^{B} |x_i - y_i|}{\sum_{i=1}^{B} x_i + \sum_{i=1}^{B} y_i} \times 100\%.$$

Of course, the quantity could be expressed simply as a ratio rather than multiplied by 100%; the underlying principles are the same.

K%-clustering is an improvement over statistical clustering. It measures the absolute closeness between reuse signatures. The result is tangible—the distance difference is no more than k %. The partitions are hierachically nested. If the value of k % is decreased, clusters resulting from a lower k must be a finer partition of those from a higher k. The problem, however, is that the test, k %, is relative to the reuse distance. Consider two elements in a 1% group. The first is always reused by a distance of 100 million. The reuse distance of the second element can range from 99 million to 101 million, therefore having little chance of staying in cache with the first element. The solution is in the definition of reference affinity: the link length should be constant, not relative.

A comparison of k-distance and k %-clustering shows the importance of the constant bound. The bound k plays the most critical role in the affinity definition and the affinity test.

In addition, reuse distance does not include the exact time of the data access. It is possible that two elements are accessed in the same reuse distance, but one in the first half of the execution, and the other in the other half. An improvement is to divide the execution trace into sub-parts and check the condition for each part. When an affinity group has more than two members, the maximal difference between any two members of a g-element affinity group is no more than gk/2.

The condition becomes recursive be-cause knowing group members requires knowing the group size first. The recursive equation can be solved iteratively. For each data set X, all other sets are found whose average distance differs no more than bk and let b range from 1 to g/2, where g is the number of all data sets. The solution is the largest b such that exactly b-1 data sets satisfy the condition. The solution must terminate, and the result correct.

Figure 5D:
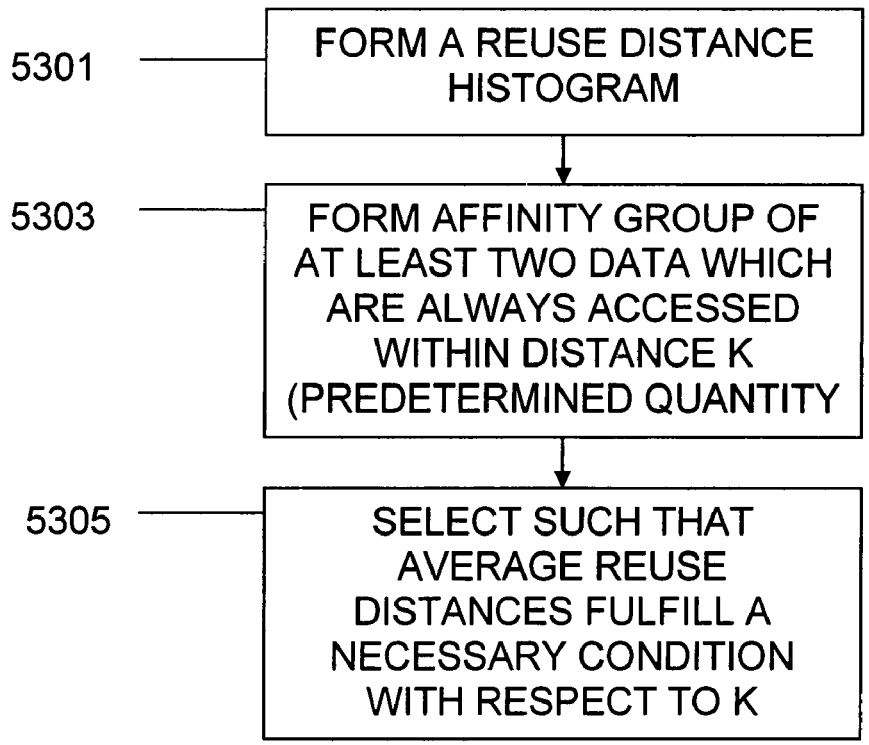

The above will be summarized with reference to FIG. 5D. In step 5301, a reuse distance histogram is formed. Ins step 5303, from the reuse distance histogram, an affinity group is formed of at least two data which are always accessed within a distance k of one another, wherein k is a predetermined quantity. In step 5305, the data are selected in the affinity group such that the data in the affinity group have average reuse distances which fulfill a necessary condition with respect to k.

The above will be summarized with reference to FIG. 5D. In step 5301, a reuse distance histogram is formed. Ins step 5303, from the reuse distance histogram, an affinity group is formed of at least two data which are always accessed within a distance k of one another, wherein k is a predetermined quantity. In step 5305, the data are selected in the affinity group such that the data in the affinity group have average reuse distances which fulfill a necessary condition with respect to k.

Figure 5E:
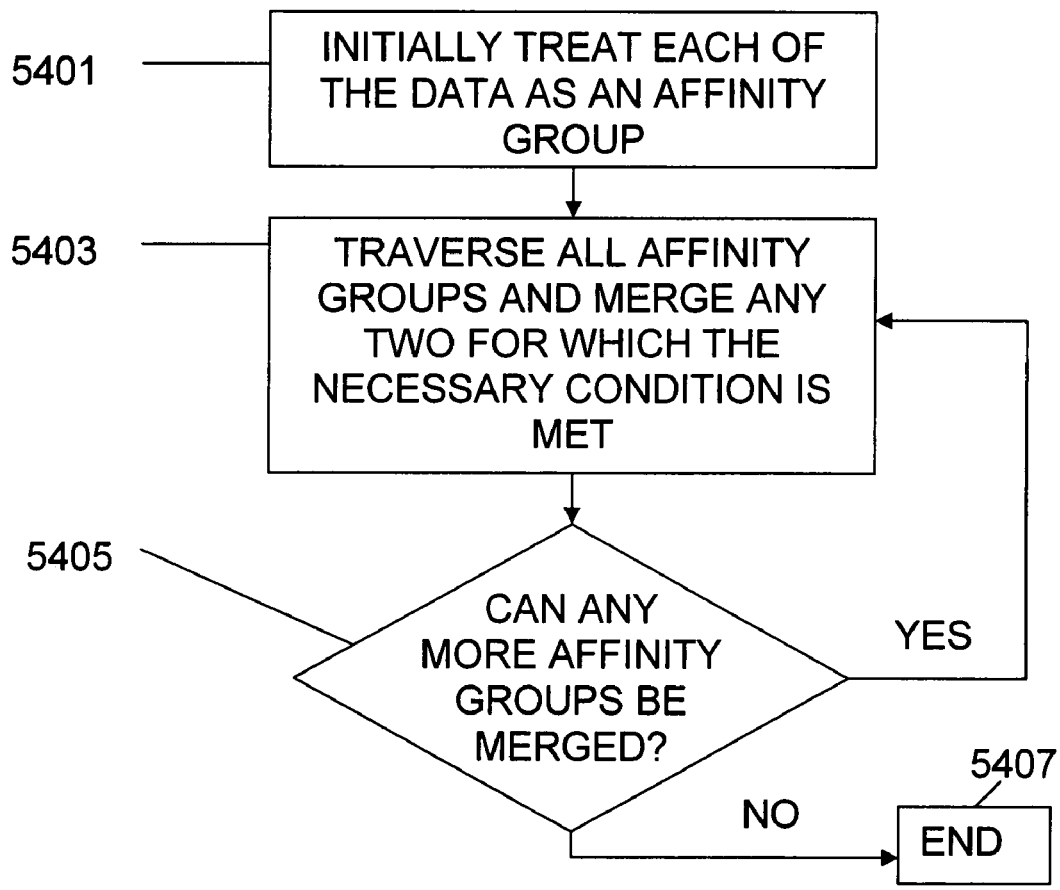
Figure 5F:
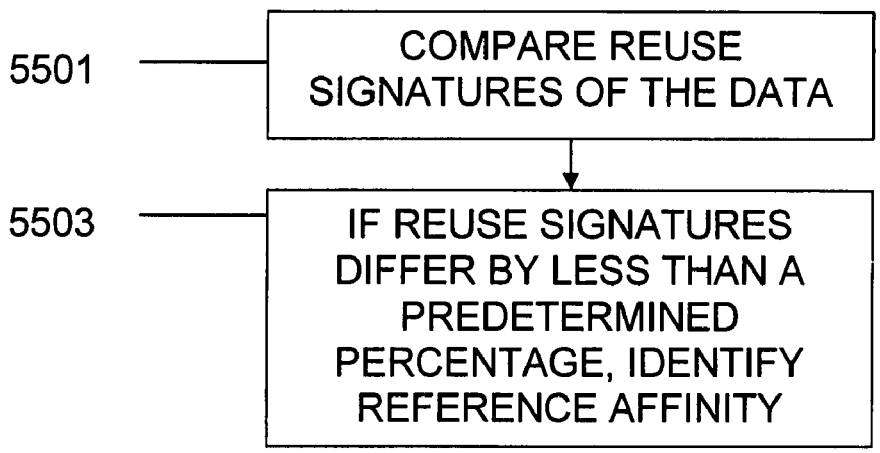

In practice, a stricter condition is used to build a group incrementally, as will be explained with reference to FIG. 5E. Initially, in step 5401, each data set is a group. Then the groups are traversed in step 5403, and two groups are merged if a member in one group and another member in the other group satisfy Equation 1. The process terminates in step 5407 if it is determined in step 5405 that no more groups can be merged. The distance difference is calculated between any two data sets in $O(g^2)$ time. The iterative solutions takes at most $O(g^2)$. The incremental solution takes linear time if implemented using a work-list.

Figure 4:
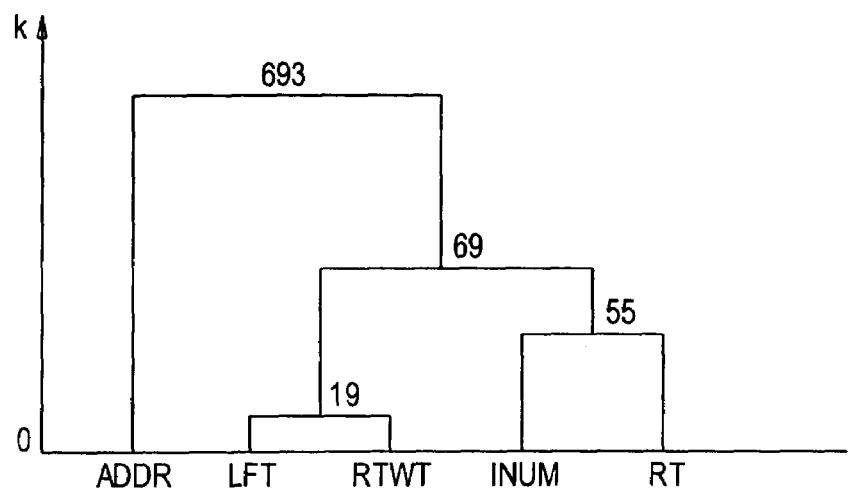
FIG. 4 is a diagram showing the reference affinities of various fields in tree form.

The reference affinity forms a hierarchy for different k values. FIG. 4 shows the hierarchy in a dendrogram. The reference affinity between lft and rtwt is the strongest—their accesses are within a distance of 19 data elements. Other two fields, inum and rt, are used together within a distance of 55. These two groups are reused within k=69. The last field, addr, has the least reference affinity, since it is not accessed with other fields within hundreds of data.

Some uses of the present invention will now be disclosed. A program has different portions of accesses with different reuse distances. The peaks differ in number, position, shape, and size among different programs and among different inputs to the same program. Since the present method predicts these peaks, it helps to better model program locality and consequently improves program and machine optimization as well as program-machine co-design.

Compiler design will now be considered. Reuse distance provides much richer information about a program than a cache miss rate does. For this reason, at least four compiler groups have used reuse distance for different purposes: to study the limit of register reuse and cache reuse, to evaluate the effect of program transformations, and to annotate programs with cache hints to a processor. In the last work, Beyls and D'Hollander used reuse distance profiles to generate hints in SPEC95 FP benchmarks and improved performance by 7% on an Itanium processor. The techniques of the present invention will allow compiler writers to analyze larger programs faster and with adjustable accuracy and to predict analysis results on data inputs other than analyzed ones. Another potential use is to find related data in a program based on their usage pattern, for example, arrays or structure fields that can be grouped to improve cache performance.

The present invention also allows reconfigurable memory systems. A recent trend in memory system design is adaptive caching based on the usage pattern of a running program. Balasubramonian et al. described a system that can dynamically change the size, associativity, and the number of levels of on-chip cache to improve cache speed and save energy. They used an on-line method that tries different choices and searches for an appropriate cache configuration. Since the pattern analysis directly determines the best cache size for capacity misses, it should reduce the search space (and overhead) of run-time adaptation. For FPGA-based systems, So et al. showed that a best design can be found by examining only 0.3% of design space with the help of program information, including the balance between computation and memory transfer as defined by Callahan et al. So et al. used a compiler to adjust program balance in loop nests and to enable software and hardware co-design. While the analysis can-not change a program to have a particular balance (as techniques such as unroll-and-jam do), it can measure memory balance and support hardware adaptation for general programs.

Yet another example is file caching. Two recent studies by Zhou et al. and by Jiang and Zhang have used reuse distance in file caching. The common approach is to partition cache space into multiple buffers, each holding data of different reuse distances. Both studies showed that reuse-distance based methods well adapt to the access pattern in server and database traces and therefore significantly outperform single-buffer LRU and frequency-based multi-buffer schemes. Zhou et al. used run-time statistics to estimate the peak distance. The present work will help in two ways. The first is faster analysis, which reduces management cost for large buffers (such as server cache), handles larger traces, and provides faster run-time feedbacks. The second is predication, which gives not only the changing pattern but also a quantitative measure of the regularity within and between different types of workloads.

While a preferred embodiment of the invention has been disclosed in detail, those skilled in the art who have reviewed the present disclosure will readily appreciate that other embodiments can be realized within the scope of the invention. For example, disclosures of specific hardware or software (e.g., development tools) are illustrative rather than limiting, as are disclosures of specific uses of the invention. Therefore, the invention should be construed as limited only by the appended claims.

We claim:

1. A method for analyzing reuse patterns of accesses of data by a program naming on a computing device, the computing device having a memory in which the data are stored and from which the data are accessed, the method comprising:

(a) running the program on the computing device;
   (b) monitoring the accesses of the data by the program during step (a); and
   (c) determining a reuse distance for each datum from among the data accessed by the program during step (a), the reuse distance being a number of distinct data which are accessed between two accesses of the datum, wherein step (c) comprises:

determining a last access time of each of the data;
   organizing a search tree from the last accesses, wherein the search tree comprises a node for each of the data, the node comprising the last access time and a weight of a sub-tree of the node; and compressing the search tree in accordance with a bounded relative error.

2. The method of claim 1, wherein the search tree is compressed by (i) determining a capacity of each node in accordance with the reuse distance and the bounded relative error and (ii) merging adjacent ones of the nodes in accordance with the capacities of the nodes.

3. A method for analyzing reuse patterns of accesses of data by a program running on a computing device, the computing device having a memory in which the data are stored and from which the data are accessed, the method comprising:

(a) running the program on the computing device;

(b) monitoring the accesses of the data by the program during step (a); and (c) determining a reuse distance for each datum from among the data accessed by the program during step (a), the reuse distance being a number of distinct data which are accessed between two accesses of the datum, wherein step (c) comprises:

determining a last access time of each of the data;

maintaining a trace storing the last access times of the last C accesses of the data, where C is a cut-off distance; and maintaining a search tree storing access times other than the last C accesses, each node in the search wee having a capacity B, where B is a bounded absolute error.

4. A method for analyzing reuse patterns of accesses of data by a program running on a computing device, the computing device having a memory in which the data are stored and from which the data are accessed, the method comprising:

(a) running the program on the computing device;

(b) monitoring the accesses of the data by the program during step (a);

(c) determining a reuse distance for each datum from among the data accessed by the program during step (a), the reuse distance being a number of distinct data which are accessed between two accesses of the datum, wherein step (c) comprises:

determining a last access time of each of the data;

maintaining a trace storing the last access times of the last C accesses of the data, where C is a cut-off distance; and maintaining a search tree storing access times other than the last C accesses, each node in the search tree having a capacity B, where B is a bounded absolute error; and (d) determining a reuse pattern from the reuse distances determined in step (c), wherein step (d) comprises forming a reuse distance histogram of the reuse distances by absolute ranges of the reuse distances, and wherein step (d) further comprises forming a reference histogram of the reuse distances by percentile ranges of the reuse distances.

5. The method of claim 4, wherein the reference histogram is formed for a plurality of training inputs.

6. The method of claim 5, wherein step (d) further comprises using the reference histograms for the plurality of training inputs to map data size to the reuse distance.

7. The method of claim 6, wherein the data size is mapped to the reuse distance through linear fitting.

8. A method for analyzing reuse patterns of accesses of data by a program running on a computing device, the computing device having a memory in which the data are stored and from which the data are accessed, the method comprising:

(a) running the program on the computing device;

(b) monitoring the accesses of the data by the program during step (a);

(c) determining a reuse distance for each datum from among the data accessed by the program during step (a), the reuse distance being a number of distinct data which are accessed between two accesses of the datum, wherein step (c) comprises:

determining a last access time of each of the data;

maintaining a trace storing the last access times of the last C accesses of the data, where C is a cut-off distance; and maintaining a search tree storing access times other than the last C accesses, each node in the search tree having a capacity B, where B is a bounded absolute error;

(d) determining a reuse pattern from the reuse distances determined in step (c), wherein step (d) comprises forming a reuse distance histogram of the reuse distances by absolute ranges of the reuse distances; and (e) from the reuse distance histogram, forming an affinity group of at least two data which are always accessed within a distance k of one another, wherein k is a predetermined quantity.

9. The method of claim 8, wherein step (e) comprises selecting the data in the affinity group such that the data in the affinity group have average reuse distances which fulfill a necessary condition with respect to k.

10. The method of claim 9 wherein the necessary condition is that the average reuse distances differ by no more than k.

11. The method of claim 9, wherein:

the reuse distance histogram comprises B bins; and the necessary condition is that differences between the average reuse distances, summed over all of the bins, do not exceed kB.

12. The method of claim 11, wherein step (e) comprises:

(i) initially treating each of the data as an affinity group;

(ii) traversing all of the affinity groups and merging any two affinity groups for which the necessary condition is met; and (iii) performing step (e)(ii) until no more of the affinity groups can be merged.

13. The method of claim 8, wherein step (e) is performed a plurality of times for different values of k.

14. A method for analyzing reuse patterns of accesses of data by a program running on a computing device, the computing device having a memory in which the data are stored and from which the data are accessed, the method comprising:

(a) running the program on the computing device;

(b) monitoring the accesses of the data by the program during step (a);

(c) determining a reuse distance for each datum from among the data accessed by the program during step (a), the reuse distance being a number of distinct data which are accessed between two accesses of the datum, wherein step (c) comprises:

determining a last access time of each of the data;

maintaining a trace storing the last access times of the last C accesses of the data, where C is a cut-off distance; and maintaining a search tree storing access times other than the last C accesses, each node in the search tree having a capacity B, where B is a bounded absolute error;

(d) comparing reuse signatures of the data to determine whether two or more of the data have reuse signatures which differ by less than a predetermined percentage; and (e) for any two or more of the data whose reuse signatures differ by less than said predetermined percentage, identifying a reference affinity among said two or more data.

15. A computing device capable of analyzing reuse patterns of accesses of data by a program running on a computing device, the computing device comprising:

a memory in which the data are stored and from which the data are accessed; and a processor, in communication with the memory, for:

(a) running the program on the computing device;

(b) monitoring the accesses of the data by the program during step (a); and (c) determining a reuse distance for each datum from among the data accessed by the program during step (a), the reuse distance being a number of distinct data which are accessed between two accesses of the datum, wherein the processor performs step (c) by:

determining a last access time of each of the data;

organizing a search free from the last accesses, wherein the search tree comprises a node for each of the data, the node comprising the last access time and a weight of a sub-tree of the node; and compressing the search tree in accordance with a bounded relative error.

16. The computing device of claim 15, wherein the search tree is compressed by (i) determining a capacity of each node in accordance with the reuse distance and the bounded relative error and (ii) merging adjacent ones of the nodes in accordance with the capacities of the nodes.

17. A computing device capable of analyzing reuse patterns of accesses of data by a program running on a computing device, the computing device comprising:

a memory in which the data are stored and from which the data are accessed; and a processor, in communication with the memory, for:

(a) running the program on the computing device;

(b) monitoring the accesses of the data by the program during step (a); and (c) determining a reuse distance for each datum from among the data accessed by the program during step (a), the reuse distance being a number of distinct data which are accessed between two accesses of the datum, wherein the processor performs step (c) by:

maintaining a trace storing the last access times of the last C accesses of the data, where C is a cut-off distance; and maintaining a search tree storing access times other than the last C accesses, each node in the search free having a capacity B, where B is a bounded absolute error.

18. A computing device capable of analyzing reuse patterns of accesses of data by a program running on a computing device, the computing device comprising:

a memory in which the data are stored and from which the data are accessed; and a processor, in communication with the memory, for:

(a) running the program on the computing device;

(b) monitoring the accesses of the data by the program during step (a);

(c) determining a reuse distance for each datum from among the data accessed by the program during step (a), the reuse distance being a number of distinct data which are accessed between two accesses of the datum, wherein step (c) comprises:

determining a last access time of each of the data:

maintaining a trace storing the last access times of the last C accesses of the data, where C is a cut-off distance; and maintaining a search tree storing access times other than the last C accesses, each node in the search free having a capacity B, where B is a bounded absolute error; and (d) determining a reuse pattern from the reuse distances determined in step (c), wherein the processor performs step (d) by forming a reuse distance histogram of the reuse distances by absolute ranges of the reuse distances, and wherein the processor further performs step (d) by forming a reference histogram of the reuse distances by percentile ranges of the reuse distances.

19. The computing device of claim 18, wherein the reference histogram is formed for a plurality of training inputs.

20. The computing device of claim 19, wherein the processor performs step (d) further by using the reference histograms for the plurality of training inputs to map data size to the reuse distance.

21. The computing device of claim 20, wherein the data size is mapped to the reuse distance through linear fitting.

22. A computing device capable of analyzing reuse patterns of accesses of data by a program running on a computing device, the computing device comprising:

a memory in which the data are stored and from which the data are accessed; and a processor, in communication with the memory, for:

(a) running the program on the computing device;

(b) monitoring the accesses of the data by the program during step (a);

(c) determining a reuse distance for each datum from among the data accessed by the program during step (a), the reuse distance being a number of distinct data which are accessed between two accesses of the datum, wherein step (c) comprises:

determining a last access time of each of the data;

maintaining a trace storing the last access times of the last C accesses of the data, where C is a cut-off distance; and maintaining a search tree storing access times other than the last C accesses, each node in the search tree having a capacity B, where B is a bounded absolute error;

(d) determining a reuse pattern from the reuse distances determined in step (c), wherein the processor performs step (d) by forming a reuse distance histogram of the reuse distances by absolute ranges of the reuse distances, and (e) from the reuse distance histogram, forming an affinity group of at least two data which are always accessed within a distance k of one another, wherein k is a predetermined quantity.

23. The computing device of claim 22, wherein the processor performs step (e) by selecting the data in the affinity group such that the data in the affinity group have average reuse distances which fulfill a necessary condition with respect to k.

24. The computing device of claim 23, wherein the necessary condition is that the average reuse distances differ by no more than k.

25. The computing device of claim 23, wherein:
the reuse distance histogram comprises B bins; and
the necessary condition is that differences between the average reuse distances, summed over all of the bins, do not exceed kB.

26. The computing device of claim 25, wherein the processor performs step (e) by:
(i) initially treating each of the data as an affinity group;
(ii) traversing all of the affinity groups and merging any two affinity groups for which the necessary condition is met; and
(iii) performing step (e)(ii) until no more of the affinity groups can be merged.

27. The computing device of claim 26, wherein step (e) is performed a plurality of times for different values of k.

28. A computing device capable of analyzing reuse patterns of accesses of data by a program running on a computing device, the computing device comprising:
a memory in which the data are stored and from which the data are accessed; and
a processor, in communication with the memory, for:
(a) running the program on the computing device;
(b) monitoring the accesses of the data by the program during step (a);
(c) determining a reuse distance for each datum from among the data accessed by the program during step (a), the reuse distance being a number of distinct data which are accessed between two accesses of the datum, wherein step (c) comprises:
determining a last access time of each of the data;
maintaining a trace storing the last access times of the last C accesses of the data, where C is a cut-off distance; and
maintaining a search tree storing access times other than the last C accesses, each node in the search tree having a capacity B, where B is a bounded absolute error;
(d) comparing reuse signatures of the data to determine whether two or more of the data have reuse signatures which differ by less than a predetermined percentage; and
(e) for any two or more of the data whose reuse signatures differ by less than said predetermined percentage, identifying a reference affinity among said two or more data.

29. A method for analyzing affinities among a plurality of events, the method comprising:
(a) monitoring occurrences of the events;
(b) determining a reoccurrence distance for each event, the reoccurrence distance being a number of distinct ones of the plurality of events which occur between two occurrences of said each event, wherein step (b) comprises:
determining a last occurrence of each of the events;
maintaining a trace storing the last occurrences of the last C events, where C is a cut-off distance; and
maintaining a search tree storing occurrences other than the last C occurrences, each node in the search tree having a capacity B, where B is a bounded absolute error; and
(c) determining, from the reoccurrence distance determined in step (b), an affinity among at least two of the events, the affinity being a tendency of said at least two of the events to occur together.

30. The method of claim 29, wherein step (c) comprises determining the affinity such that said events always occur within a distance k of each other, wherein k is a predetermined quantity and the distance is a number of distinct events occurring between occurrences of said at least two of the events.

31. The method of claim 29, wherein step (c) comprises comparing reoccurrence signatures of the events to determine whether said two or more of the events have reoccurrence signatures which differ by less than a predetermined percentage.

32. A method for analyzing reuse patterns of accesses of data by a program running on a computing device, the computing device having a memory in which the data are stored and from which the data are accessed, the method comprising:
(a) running the program on the computing device;
(b) monitoring the accesses of the data by the program during step (a);
(c) determining a reuse distance for each datum from among the data accessed by the program during step (a), the reuse distance being a number of distinct data which are accessed between two accesses of the datum, wherein step (c) comprises:
determining a last access time of each of the data;
organizing a search free from the last accesses, wherein the search tree comprises a node for each of the data, the node comprising the last access time and a weight of a sub-tree of the node; and
compressing the search tree in accordance with a bounded relative error; and
(d) determining a reuse pattern from the reuse distances determined in step (c), wherein step (d) comprises forming a reuse distance histogram of the reuse distances by absolute ranges of the reuse distances, and wherein step (d) further comprises forming a reference histogram of the reuse distances by percentile ranges of the reuse distances.

33. The method of claim 32, wherein the reference histogram is formed for a plurality of training inputs.

34. The method of claim 33, wherein step (d) further comprises using the reference histograms for the plurality of training inputs to map data size to the reuse distance.

35. The method of claim 34, wherein the data size is mapped to the reuse distance through linear fitting.

36. A method for analyzing reuse patterns of accesses of data by a program running on a computing device, the computing device having a memory in which the data are stored and from which the data are accessed, the method comprising:
(a) running the program on the computing device;
(b) monitoring the accesses of the data by the program during step (a);
(c) determining a reuse distance for each datum from among the data accessed by the program during step (a), the reuse distance being a number of distinct data which are accessed between two accesses of the datum, wherein step (c) comprises:
determining a last access time of each of the data;
organizing a search free from the last accesses, wherein the search tree comprises a node for each of the data, the node comprising the last access time and a weight of a sub-tree of the node; and
compressing the search tree in accordance with a bounded relative error;
(d) determining a reuse pattern from the reuse distances determining in step (c), wherein step (d) comprises forming a reuse distance histogram of the reuse distances by absolute ranges of the reuse distances; and (e) from the reuse distance histogram, forming an affinity group of at least two data which are always accessed within a distance k of one another, wherein k is a predetermined quantity.

37. The method of claim 36, wherein step (e) comprises selecting the data in the affinity group such that the data in the affinity group have average reuse distances which fulfill a necessary condition with respect to k.

38. The method of claim 37, wherein the necessary condition is that the average reuse distances differ by no more than k.

39. The method of claim 37, wherein:
the reuse distance histogram comprises B bins; and
the necessary condition is that differences between the average reuse distances, summed over all of the bins, do not exceed kB.

40. The method of claim 39, wherein step (e) comprises:
(i) initially treating each of the data as an affinity group;
(ii) traversing all of the affinity groups and merging any two affinity groups for which the necessary condition is met; and
(iii) performing step (e)(ii) until no more of the affinity groups can be merged.

41. The method of claim 36, wherein step (e) is performed a plurality of times for different values of k.

42. A method for analyzing reuse patterns of accesses of data by a program running on a computing device, the computing device having a memory in which the data are stored and from which the data are accessed, the method comprising:
(a) running the program on the computing device;
(b) monitoring the accesses of the data by the program during step (a);
(c) determining a reuse distance for each datum from among the data accessed by the program during step (a), the reuse distance being a number of distinct data which are accessed between two accesses of the datum, wherein step (c) comprises:
determining a last access time of each of the data;
organizing a search tree from the last accesses, wherein the search tree comprises a node for each of the data, the node comprising the last access time and a weight of a sub-tree of the node; and
compressing the search tree in accordance with a bounded relative error;
(d) comparing reuse signatures of the data to determine whether two or more of the data have reuse signatures which differ by less than a predetermined percentage; and
(e) for any two or more of the data whose reuse signatures differ by less than said predetermined percentage, identifying a reference affinity among said two or more data.

43. A computing device capable of analyzing reuse patterns of accesses of data by a program running on a computing device, the computing device comprising:
a memory in which the data are stored and from which the data are accessed; and
a processor, in communication with the memory, for:
(a) running the program on the computing device;
(b) monitoring the accesses of the data by the program during step (a);
(c) determining a reuse distance for each datum from among the data accessed by the program during step (a), the reuse distance being a number of distinct data which are accessed between two accesses of the datum, wherein step (c) comprises:
determining a last access time of each of the data;
organizing a search tree from the last accesses, wherein the search tree comprises a node for each of the data, the node comprising the last access time and a weight of a sub-tree of the node; and
compressing the search tree in accordance with a bounded relative error; and
(d) determining a reuse pattern from the reuse distances determined in step (c), wherein the processor performs step (d) by forming a reuse distance histogram of the reuse distances by absolute ranges of the reuse distances, and wherein the processor further performs step (d) by forming a reference histogram of the reuse distances by percentile ranges of the reuse distances.

44. The computing device of claim 43, wherein the reference histogram is formed for a plurality of training inputs.

45. The computing device of claim 44, wherein the processor performs step (d) further by using the reference histograms for the plurality of training inputs to map data size to the reuse distance.

46. The computing device of claim 45, wherein the data size is mapped to the reuse distance through linear fitting.

47. A computing device capable of analyzing reuse patterns of accesses of data by a program running on a computing device, the computing device comprising:
a memory in which the data are stored and from which the data are accessed; and
a processor, in communication with the memory, for:
(a) running the program on the computing device;
(b) monitoring the accesses of the data by the program during step (a);
(c) determining a reuse distance for each datum from among the data accessed by the program during step (a), the reuse distance being a number of distinct data which are accessed between two accesses of the datum, wherein step (c) comprises:
determining a last access time of each of the data;
organizing a search tree from the last accesses, wherein the search tree comprises a node for each of the data, the node comprising the last access time and a weight of a sub-tree of the node; and
compressing the search free in accordance with a bounded relative error;
(d) determining a reuse pattern from the reuse distances determined in step (c), wherein the processor performs step (d) by forming a reuse distance histogram of the reuse distances by absolute ranges of the reuse distances, and
(e) from the reuse distance histogram, forming an affinity group of at least two data which are always accessed within a distance k of one another, wherein k is a predetermined quantity.

48. The computing device of claim 47, wherein the processor performs step (e) by selecting the data in the affinity group such that the data in the affinity group have average reuse distances which fulfill a necessary condition with respect to k.

49. The computing device of claim 48, wherein the necessary condition is that the average reuse distances differ by no more than k.

50. The computing device of claim 48, wherein:
the reuse distance histogram comprises B bins; and
the necessary condition is that differences between the average reuse distances, summed over all of the bins, do not exceed kB.

51. The computing device of claim 50, wherein the processor performs step (e) by:
  (i) initially treating each of the data as an affinity group;
  (ii) traversing all of the affinity groups and merging any two affinity groups for which the necessary condition is met; and
  (iii) performing step (e)(ii) until no more of the affinity groups can be merged.

52. The computing device of claim 51, wherein step (e) is performed a plurality of times for different values of k.

53. A computing device capable of analyzing reuse patterns of accesses of data by a program running on a computing device, the computing device comprising:
  a memory in which the data are stored and from which the data are accessed; and
  a processor, in communication with the memory, for:
  (a) running the program on the computing device;
  (b) monitoring the accesses of the data by the program during step (a);
  (c) determining a reuse distance for each datum from among the data accessed by the program during step (a), the reuse distance being a number of distinct data which are accessed between two accesses of the datum, wherein step (c) comprises:
    determining a last access time of each of the data;
    organizing a search tree from the last accesses, wherein the search tree comprises a node for each of the data, the node comprising the last access time and a weight of a sub-tree of the node; and
    compressing the search tree in accordance with a bounded relative error;
  (d) comparing reuse signatures of the data to determine whether two or more of the data have reuse signatures which differ by less than a predetermined percentage; and
  (e) for any two or more of the data whose reuse signatures differ by less than said predetermined percentage, identifying a reference affinity among said two or more data.

54. A method for analyzing affinities among a plurality of events, the method comprising:
  (a) monitoring occurrences of the events;
  (b) determining a reoccurrence distance for each event, the reoccurrence distance being a number of distinct ones of the plurality of events which occur between two occurrences of said each event, wherein step (b) comprises:
    determining a last occurrence of each of the events;
    organizing a search free from the last occurrences, wherein the search tree comprises a node for each of the events, the node comprising the last occurrence and a weight of a sub-tree of the node; and
    compressing the search free in accordance with a bounded relative error; and
  (c) determining, from the reoccurrence distance determined in step (b), an affinity among at least two of the events, the affinity being a tendency of said at least two of the events to occur together.

55. The method of claim 54, wherein step (c) comprises determining the affinity such that said events always occur within a distance k of each other, wherein It is a predetermined quantity and the distance is a number of distinct events occurring between occurrences of said at least two of the events.

56. The method of claim 54, wherein step (c) comprises comparing reoccurrence signatures of the events to determine whether said two or more of the events have reoccurrence signatures which differ by less than a predetermined percentage.

* * * * *

UNITED STATES PATENT AND TRADEMARK OFFICE
CERTIFICATE OF CORRECTION

| | | |
|---|---|---|
| PATENT NO. | : 7,356,805 B2 | Page 1 of 1 |
| APPLICATION NO. | : 10/750552 | |
| DATED | : April 8, 2008 | |
| INVENTOR(S) | : Chen Ding et al. | |

It is certified that error appears in the above-identified patent and that said Letters Patent is hereby corrected as shown below:

The following statement should be included in column 1, between lines 9 and 10:

STATEMENT OF GOVERNMENT INTEREST

The work leading to the present invention was supported in part by the United States Department of Energy under Grant No. DE-FG02-02ER25525. The government has certain rights in this invention.

Signed and Sealed this

Twenty-second Day of December, 2009

David J. Kappos
*Director of the United States Patent and Trademark Office*